US010353880B2

(12) United States Patent
Myadam

(10) Patent No.: US 10,353,880 B2
(45) Date of Patent: Jul. 16, 2019

(54) SYSTEM AND METHOD FOR GOVERNING PERFORMANCES OF MULTIPLE HARDWARE DEVICES

(71) Applicant: Wipro Limited, Bangalore (IN)

(72) Inventor: Raju Myadam, Hyderabad (IN)

(73) Assignee: Wipro Limited, Bangalore (IN)

( * ) Notice: Subject to any disclaimer, the term of this patent is extended or adjusted under 35 U.S.C. 154(b) by 399 days.

(21) Appl. No.: 15/085,216

(22) Filed: Mar. 30, 2016

(65) Prior Publication Data

US 2017/0264511 A1 Sep. 14, 2017

(30) Foreign Application Priority Data

Mar. 14, 2016 (IN) .............................. 201641008870

(51) Int. Cl.

| H04L 12/26 | (2006.01) |
|---|---|
| G06F 16/25 | (2019.01) |
| G06F 16/22 | (2019.01) |
| H04L 12/24 | (2006.01) |

(52) U.S. Cl.
CPC ............ G06F 16/22 (2019.01); G06F 16/258 (2019.01); H04L 43/065 (2013.01); H04L 43/0817 (2013.01); H04L 41/0686 (2013.01)

(58) Field of Classification Search
CPC ......... G06F 17/30312; G06F 17/30569; H04L 41/0686; H04L 43/045; H04L 43/065
See application file for complete search history.

(56) References Cited

U.S. PATENT DOCUMENTS

| 2012/0086563 A1 | 4/2012 | Arling et al. |
| 2012/0203877 A1* | 8/2012 | Bartholomay ...... H04L 63/0227 709/221 |
| 2014/0044001 A1 | 2/2014 | Akai et al. |
| 2014/0207707 A1 | 7/2014 | Na et al. |

(Continued)

FOREIGN PATENT DOCUMENTS

| CN | 102546478 | 7/2012 |
| WO | WO 2015/024349 A1 | 2/2015 |

OTHER PUBLICATIONS

Agil Francis et al., "Next-Generation Insurance: Tapping into the Intelligence of Smart Homes", Jul. 2015, *Cognizant*, pp. 1-16.

*Primary Examiner* — Andrew Lai
*Assistant Examiner* — M Mostazir Rahman
(74) *Attorney, Agent, or Firm* — Finnegan, Henderson, Farabow, Garrett & Dunner, LLP

(57) ABSTRACT

Certain embodiments of the present disclosure relate to a method for managing performances of hardware devices on a real-time basis. The method includes identifying, by a managing device, at least one electronic device through at least one personal network, identifying, by the managing device, at least one device manufacturer through at least one commercial network, associated with the at least one electronic device, determining, by the managing device, one or more device parameters associated with the at least one electronic device, analyzing, by the managing device, performance data associated with the at least one electronic device based on the one or more device parameters, and generating, by the managing device, one or more recommendations data based on the performance data.

19 Claims, 4 Drawing Sheets

(56) References Cited

U.S. PATENT DOCUMENTS

| | | | | |
|---|---|---|---|---|
| 2015/0094968 A1* | 4/2015 | Jia | G06Q 40/04 |
| | | | 702/60 |
| 2015/0212126 A1* | 7/2015 | Harding | G06F 17/30876 |
| | | | 707/756 |
| 2015/0365480 A1* | 12/2015 | Soto | H04L 12/2827 |
| | | | 709/224 |
| 2016/0005281 A1* | 1/2016 | Laska | G06K 9/00771 |
| | | | 348/143 |
| 2016/0247164 A1* | 8/2016 | Salajegheh | G06Q 30/016 |
| 2017/0230350 A1* | 8/2017 | Enrique Salpico | H04L 63/083 |
| 2017/0284691 A1* | 10/2017 | Sinha | F24F 11/006 |
| 2018/0025230 A9* | 1/2018 | Laska | G06K 9/00765 |

* cited by examiner

(12) United States Patent
US 10,353,880 B2

SYSTEM AND METHOD FOR GOVERNING PERFORMANCES OF MULTIPLE HARDWARE DEVICES

TECHNICAL FIELD

This disclosure relates generally to communications environment. More specifically, it relates to a system and method for governing performances of hardware devices on a real-time basis.

BACKGROUND

Mankind dependency on electronic items is only fast growing. With the advent of Internet of things (IoT), most of the electronic items such as the television, washing machine, kitchen appliances like microwave oven, refrigerator even simple electrical appliances including the fan, heater, lights and switches are connected to a network that enables the viewing and controlling of them through an application on handheld devices by the end user constructing a home environment. An end user is not compelled to buy a single or a specific manufacturer's products due to individual preferences. Hence creating a fuss, with multiple manufacturer's mobile applications to view and control them separately. This also has inconvenience of manually registering a new device into their home system.

Manufactures today can monitor and provide feedbacks periodically but not in real time, causing wrong or insufficient usage of the appliances by the end users, reducing the life time of the product and the reputation of the manufacturer.

Accordingly, in light of the above, there exists a need for a system and method governing or managing performances of the hardware devices.

SUMMARY

Certain embodiments of the present disclosure relate to a method for managing performances of hardware devices on a real-time basis. The method includes identifying, by a managing device, at least one electronic device through at least one personal network, identifying, by the managing device, at least one device manufacturer through at least one commercial network, associated with the at least one electronic device, determining, by the managing device, one or more device parameters associated with the at least one electronic device, analyzing, by the managing device, performance data associated with the at least one electronic device based on the one or more device parameters, and generating, by the managing device, one or more recommendations data based on the performance data.

Certain embodiments of the present disclosure also relate to a system for managing performances of multiple hardware devices that includes at least one processor in electronic communication with a managing device, external manufacturer applications, and a single viewer devices dashboard, and a computer-readable medium storing instructions that, when executed by the at least one processor, cause the at least one processor to identify at least one electronic device through at least one personal network, identify at least one device manufacturer through at least one commercial network, associated with the at least one electronic device, determine one or more device parameters associated with the at least one electronic device, analyze performance data associated with the at least one electronic device based on the one or more device parameters, generate one or more recommendations data based on the performance data.

Certain embodiments of the present disclosure also relate to a non-transitory computer readable medium including instructions stored thereon that when processed by a processor cause a first computing device to perform acts of: identifying, by a managing device, at least one electronic device through at least one personal network; identifying, by the managing device, at least one device manufacturer through at least one commercial network, associated with the at least one electronic device; determining, by the managing device, one or more device parameters associated with the at least one electronic device, analyzing, by the managing device, performance data associated with the at least one electronic device based on the one or more device parameters and generating, by the managing device, one or more recommendations data based on the performance data.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

In some embodiments, a system and a method to monitor or control the electronic devices that are from diverse manufactures through a single user interface into a "Single View of all Devices" is provided. The platform will also provide API's for manufacturers to subscribe and consume the data of all the devices in real time environment. Thus the advantages of having such single view of devices helps the device manufactures to know what device the end user is owning, how the device is being operated in real-time. This is well explained in conjunctions with the figures below from FIG. 1-FIG. 4.

Figure 1:
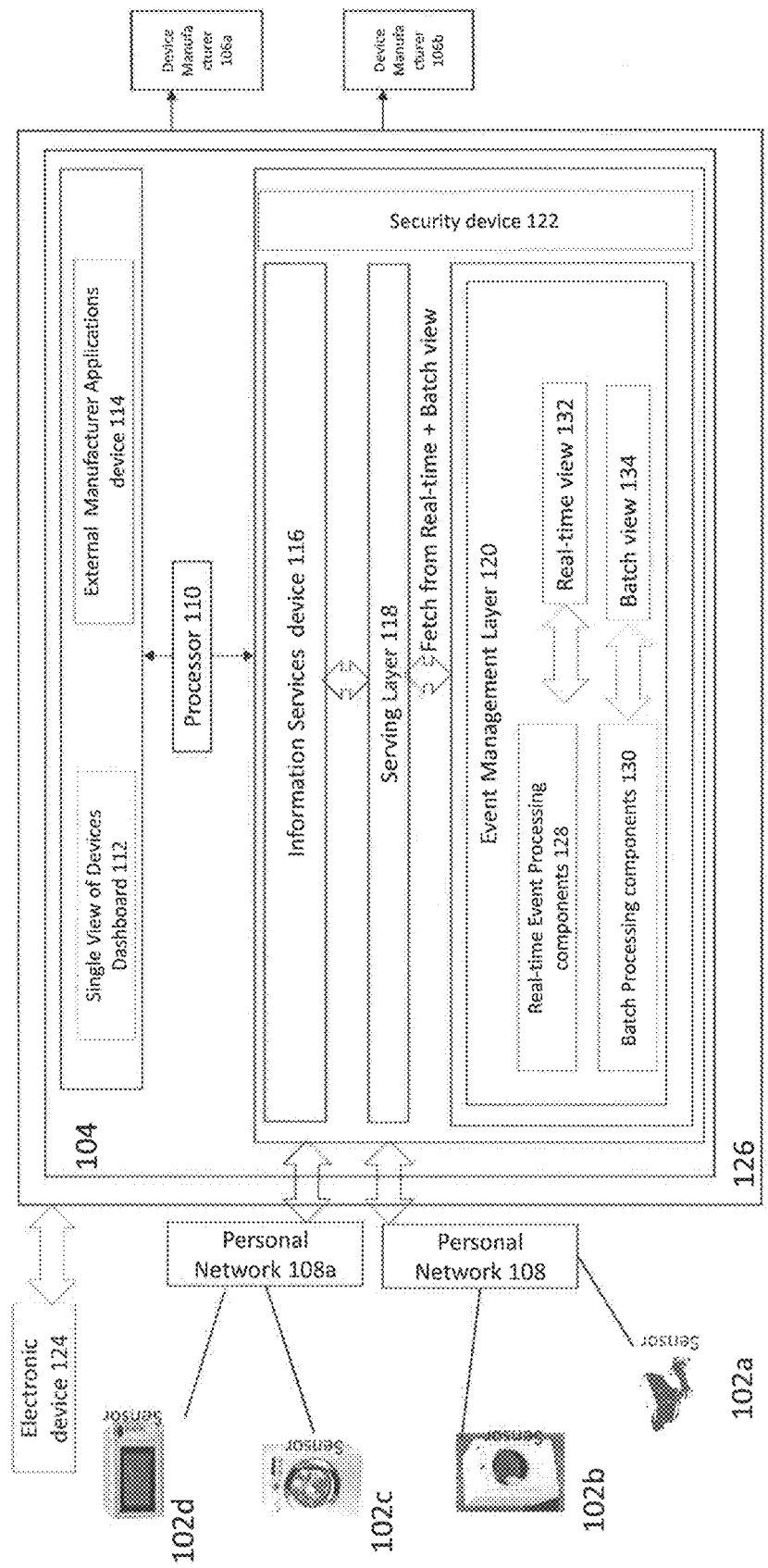
FIG. 1 illustrates an exemplary overview of a system for managing performances of hardware devices, according to some embodiments of the present disclosure.

FIG. 1 illustrates an exemplary overview of a system 100 for managing performances of hardware devices, according to some embodiments of the present disclosure. The system 100 includes one or more electronic devices, example, an electronic device 102a and an electronic device 102b. The system 100 includes a remote network 104. Further, the remote network 104 is connected to one or more device manufacturers, example a device manufacturer 106a and a device manufacturer 106b. The remote network 104 is connected with the electronic device 102a and the electronic device 102b is via at least one personal network. For example, a personal network 108. The personal network 108 may be a home network. The personal network 108a may be another network that can be further connected to multiple hardware devices. For example, a electronic device 102c and an electronic device 102d.

The remote network 104 further includes a managing device or a processor 110. The processor 110 is further connected to single view of devices dashboard 112 and an external manufacturer applications device 114. The processor 110 further connects to an information services device 116, serving layer 118, event management layer 120. The processor 110 is also connected to a security device 122. The remote network 104 is also connected to an electronic device 124 (hereinafter referred as the user device 124 or the electronic device 124). The user device 124 may be an electronic device example, a mobile phone.

The electronic device 102a may be a home appliance. For example, a washing machine. Similarly, the electronic device 102b may be refrigerator. The electronic device 102a may be a new device purchased by a user of the electronic device 124. The personal network 108 identifies the new device i.e. the electronic device 102a. The process of the personal network 108 identifying the electronic device 102a is well explained in conjunction with FIG. 2.

Figure 4:
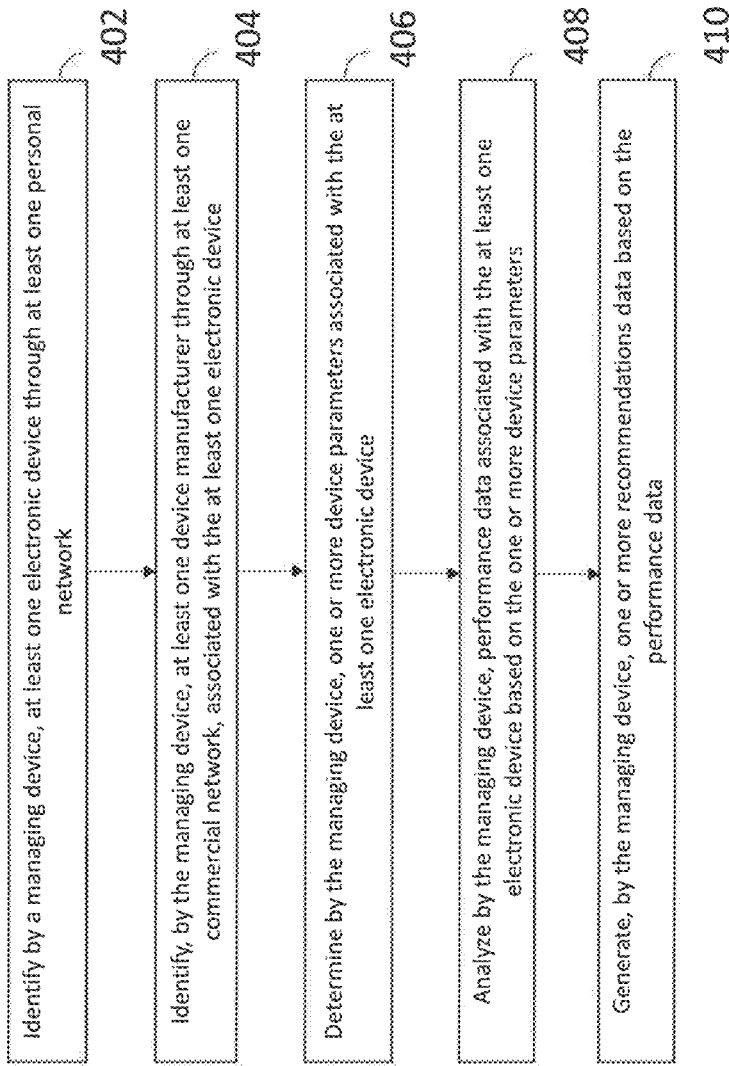
FIG. 4 is yet another exemplary flowchart showcasing a method of managing performances of hardware devices, according to some embodiments of the present disclosure.

The personal network 108 is connected to the remote network 104 via a wifi-network of the user. A remote network is hosted in a cloud gateway 126 to process real-time events. The real-time events are the real-time information data fetched by the personal network 108 from the one or more electronic devices. For example, the electronic device 102a sends its RPM information to the personal network 108 on real-time basis. FIG. 4 will provide more details on the events. The personal network 108 shall connect to the remote network via a wifi network of the user, example the wifi connection at the user premises.

Each of the one or more electronic devices may be embedded with sensors. The responsibility of the personal network 108 is to send/receive device information on real-time basis and vise versa. For example, the sensors shall detect a current reading of the electronic device 102a and the same reading shall be reported to the personal network 108. The personal network 108 on the need basis shall communicate with the electronic device 102b.

The cloud gateway 126 may have two outlets to exchange information. For example, the single view devices dashboard 112 and the external manufacturer applications device 114. The single view devices dashboard 112 may be a user interface of the electronic device 124 through which the user may view and control the one or more electronic devices. The external manufacturer applications device 114 may be the one or more device manufacturer's utility application for the purpose of receiving the real-time events of the one or more electronic devices and further sending real-time PUSH notifications to the user via the electronic device 124.

The information services layer 116 is built in buffer zone where information generated is stored and later consumed by the user and the one or more manufacturers to integrate their own applications and/or systems.

The event management layer 122 may acquire and process data from the one or more electronic devices, which are hosted on the cloud gateway 126 will capture the events on real-time and convert the data into canonical format and store it in real-time view. The event management layer 122 primarily may have the following components: a real-time event processing components 128 and batch processing components 130.

The sensors may be enabled to capture the events from the one or more electronic devices and share it with the electronic device 124. These components also receive the instruction from the electronic device 124 and then send it to the relevant one or more electronic devices for controlling purposes.

The batch processing components 130 are used to process the historical data associated with the one or more electronic devices. For example, past performance data, energy consumption, past configurational settings. This is basically to analyze the insights of the one or more electronic devices, this is shared with the one or more manufacturers also if they opt for it by subscribing through their dashboard API's. For example the one or more manufacturers might own devices like the electronic device 124. Basically it will reconcile with the previous historical data and prepare the data with updated insights of the one or more electronic devices.

The serving layer 118 aggregates the data from real-time view 132 and batch view 134. That could be subscribed by the manufacturer for their analyses of all the one or more electronic devices performances data and could be customized to receive every day, week, month or every event.

Figure 2:
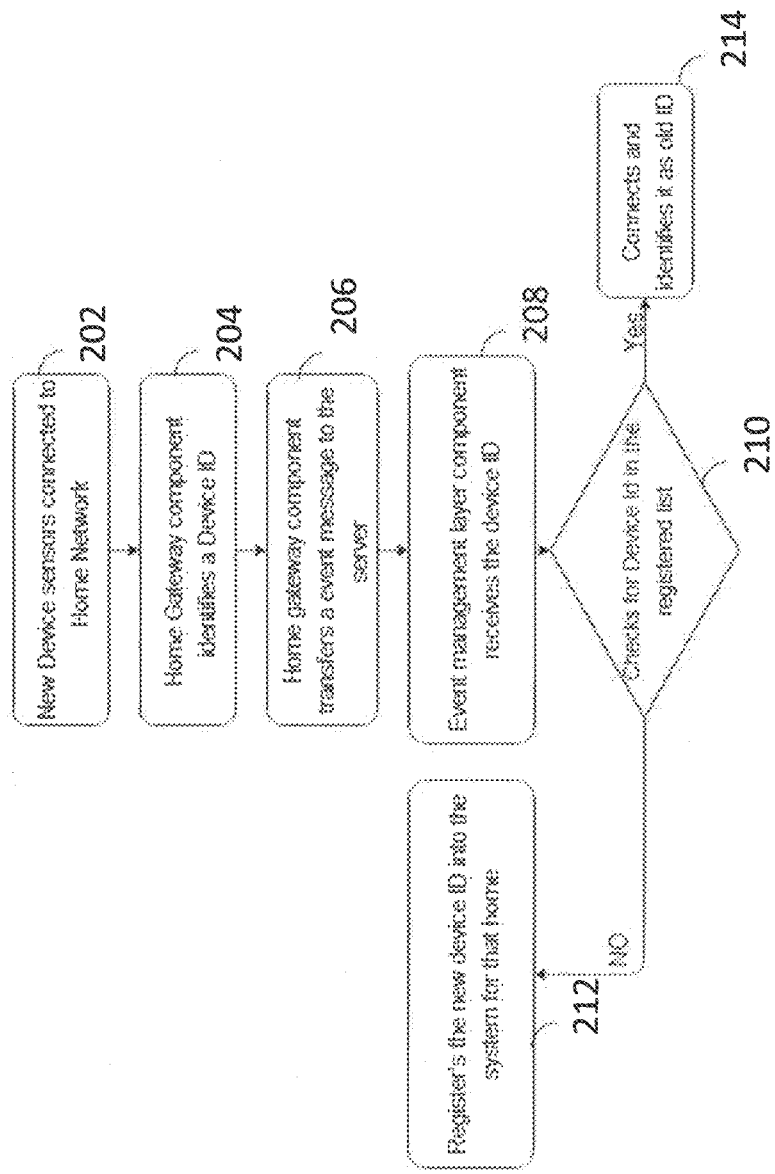
FIG. 2 is an exemplary flowchart showcasing a process of registration of any new hardware device to personal network, according to some embodiments of the present disclosure.

FIG. 2 is an exemplary flowchart showcasing a process of registration of any new hardware device to the personal network 108, according to some embodiments of the present disclosure.

At step 202, new device sensors are connected to the personal network 108. For example, sensor 1 of the electronic device 102a is connected via the wifi of the user at his premises to the personal network 108.

At step 204, the personal network 108 identified the electronic device 102a. This is mainly due to the sensor 1 associated with the electronic device 102a. The signals from the sensor 1 are sent to the personal network 108 thus making the personal network 108 alert regarding the hardware device.

At step 206, the personal network 108 transfers an event message of a server. For example, the event message could be that washing powder for the electronic device 102a is out of stock at the user premises.

At step 208, the event management layer component 120 receives the electronic device 102a ID. For example, the electronic device 102a device ID may be a digital number.

At step 210, the personal network 108 checks if the electronic device 102a is already registered with the personal network 108.

At step 212, the personal network registers the electronic device 102a into the personal network 108 system of the user premises.

At step 214, the personal network 108 connects and identifies that the electronic device 102a ID is old. For example, it recognizes that the electronic device 102a is already registered to the personal network 108 and shall end the process.

Figure 3:
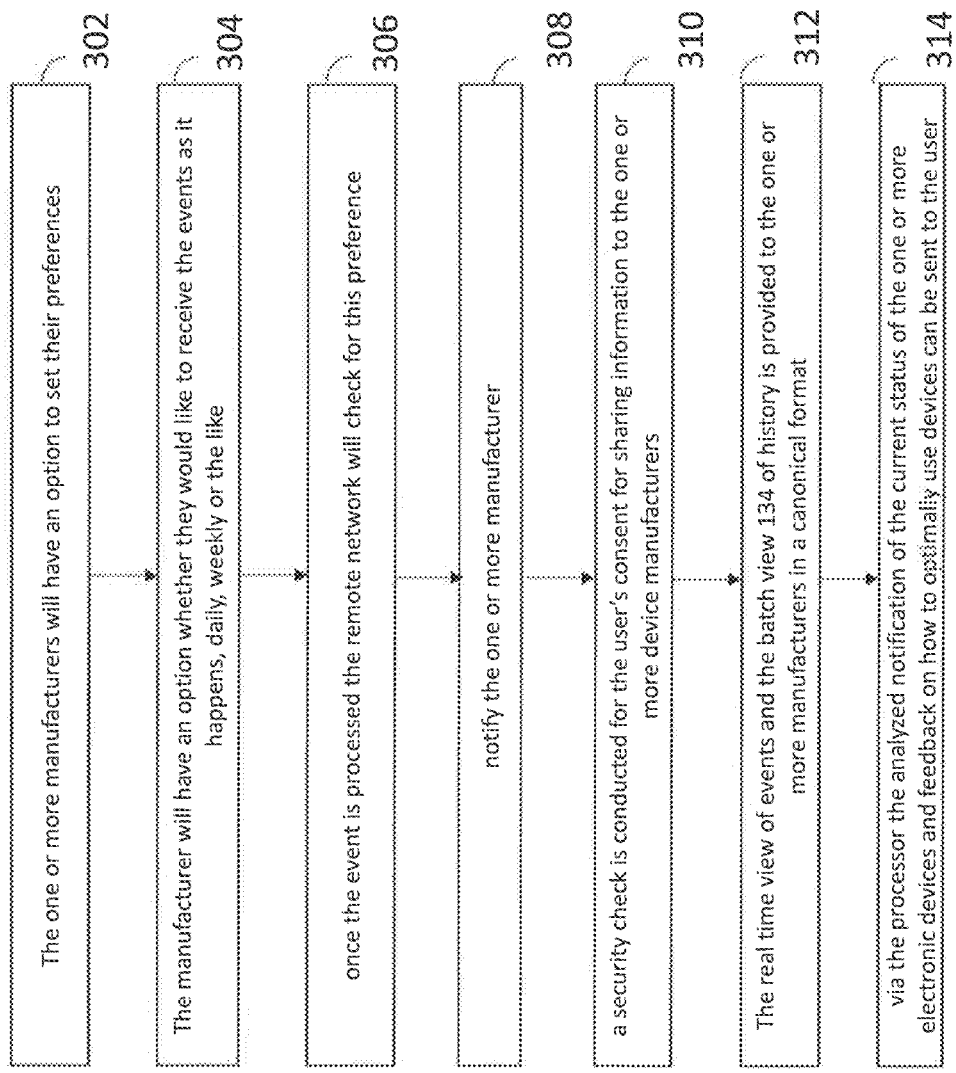
FIG. 3 is an exemplary flowchart showcasing a method of managing performances of hardware devices, according to some embodiments of the present disclosure.

FIG. 3 is an exemplary flowchart showcasing a method of governing performances of hardware devices, according to some embodiments of the present disclosure.

At step 302, the one or more manufacturers, example 106a will have an option to set their preferences. If at least one of the one or more manufacturers wants to receive events in real-time then they can subscribe via preferences.

At step 304, the manufacturer 106a will have an option whether they would like to receive the events as it happens, daily, weekly or the like.

At step 306, once the event is processed the remote network will check for this preference.

At step 308, notify the one or more manufacturer. Example, send the information to the device manufacturer 106a via manufacturer corporate email or through the API's Dashboard.

At step 310, a security check is conducted for the end user's consent for sharing information to the device Manufacturer 106a, the security check could be once for the first time or at every request of the device manufacturer 106a which can be decide by the user.

At step 312, the real time view 132 of events and the batch view 134 of history is provided to the device manufacturer 106a in a canonical format so as to be understood by all. The frequency of real time view 132 and batch view 134 reports can be pre-configured to be fetched together or different time periods.

At step 314, via the processor 110 the analyzed notification of the current status of device, example energy consumption, working hours etc. and feedback on how to optimally use devices can be sent to the user.

FIG. 4 is yet another exemplary flowchart showcasing a method of managing performances of hardware devices, according to some embodiments of the present disclosure.

At step 402, the managing device 110 or the processor 110 identifies, at least one electronic device through at least one personal network, wherein the personal network 108 is in electronic communication with the remote personal network 104. For example, the electronic device 102a is identified by the personal network 108 moment it is connected via the wifi in the user premises. The electronic device 102a may be a washing machine. Here, the remote application is a cloud based application. For example the remote application may be the application hosted in the remote network, wherein the remote network is in turn part of the cloud 126.

At step 404, the processor 110 identifies, at least one device manufacturer through at least one commercial network, associated with the at least one electronic device. The at least one commercial network may be at least one sub network of the remote personal network 104.

At step 406, determine by the processor 110, one or more device parameters associated with the at least one electronic device.

In some embodiments, the processor 110 access all information related to the one or more electronic devices by the remote application on the real-time basis. For example, the information/events like the stock information of washing powder related to the washing machine is accessed by the remote application on the real-time basis. If the powder is out of stock then the remote application shall access this information from the washing machine with the help of the sensors of the washing machine and alert the user via the electronic device 124.

For example, the working condition (at least one of the device parameters) of the washing machine, the number of spins, etc shall be alerted to the user via the electronic device 124 on real-time basis.

At step 408, the processor 110 analyzes performance data associated with the at least one electronic device based on the one or more device parameters.

In some embodiments, the processor 110 determines performance data of the one or more devices by the remote application on the real-time basis. Thus such information/events of the electronic devices help the user of the electronic device 124 to be well informed on the working conditions/performances/feedback of the home appliances.

At step 410, the processor 110 generates one or more recommendations data based on the performance data. For example, the recommendations may include the functioning of RPM of the washing machine. The processor 110 might send alerts to the user device 124 and also to the device manufacturer 106a that the washing machine (the electronic device 102a) needs a service as the RPM level has crossed its normal spin threshold limit. Thus, the device functions, or device storage capacity or the like are sent as alerts or notifications via messages, emails or the like to the user device 124 and the at least one device manufacturer.

Thus this portal shall help both the parties example the user who happens to be the customer and also the device manufacturers to govern the multiple electronic devices in a single view of remote application. This remote application shall be installed in the electronic device 124 of the device and also any remote computer for the manufactures to view on run time basis.

The specification has described systems and methods for governing performances of multiple hardware devices in real-time. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed:

1. A method for managing performances of multiple hardware devices, the method comprising:
   identifying, by a managing device, at least one electronic device through at least one personal network;
   identifying, by the managing device, a type and a device manufacturer associated with each of the at least one electronic device, through at least one commercial network;
   determining, by the managing device, one or more device parameters associated with the at least one electronic device;
   generating, by the managing device, performance data history of the at least one electronic device based on the one or more device parameters, wherein the performance data history is generated as real-time view of events and batch view in a canonical format, and the performance data history includes:
      past performance data of the at least one electronic device,
      energy consumption of the at least one electronic device, and
      past configuration settings of the at least one electronic device;
   analyzing, by the managing device, the performance data history of the at least one electronic device;
   generating, by the managing device, one or more recommendations data based on the analysis of the performance data history;
   determining that the device manufacturer associated with the at least one electronic device has subscribed to receive the generated performance data history of the at least one electronic device through an application programming interface; and
   providing to the device manufacturer, when the device manufacturer has subscribed to receive the generated performance data history, the performance data history.

2. The method of claim 1, further comprising:
   accessing information data of the at least one electronic device, wherein the information data serves as an input while determining the one or more device parameters.

3. The method of claim 1, further comprising:
   continuously monitoring the at least one electronic device; and
   generating alerts or notifications based on the outcome of the monitoring.

4. The method of claim 1, further comprising:
   determining if the at least one electronic device is registered with the managing device.

5. The method of claim 1, further comprising:
   determining if the device manufacturer is registered with the managing device.

6. The method of claim 1, further comprising:
   sending the one or more recommendations data to a user device in real-time.

7. The method of claim 1, further comprising:
   sending the one or more recommendations data to the device manufacturer in real-time.

8. A system for managing performances of multiple hardware devices, the system comprising:
   at least one processor in electronic communication with a managing device, external manufacturer applications, and a single viewer devices dashboard; and
   a non-transitory computer-readable medium storing instructions that, when executed by the at least one processor, cause the at least one processor to:
      identify at least one electronic device through at least one personal network;
      identify a type and a device manufacturer associated with each of the at least one electronic device, through at least one commercial network;
      determine, one or more device parameters associated with the at least one electronic device;
      generate performance data history of the at least one electronic device based on the one or more device parameters, wherein the performance data history is generated as real-time view of events and batch view in a canonical format, and the performance data history includes:
         past performance data of the at least one electronic device,
         energy consumption of the at least one electronic device, and
         past configuration settings of the at least one electronic device;
      analyze the performance data history of the at least one electronic device;
      generate one or more recommendations data based on the analysis of the performance data history;
      determine that the device manufacturer associated with the at least one electronic device has subscribed to receive the generated performance data history of the at least one electronic device through an application programming interface; and
      provide to the device manufacturer, when the device manufacturer has subscribed to receive the generated performance data history, the performance data history.

9. The system of claim 8, wherein the at least one electronic device uses at least one sensor to be in communication with the personal network and the managing device.

10. The system of claim 8, wherein the non-transitory computer-readable medium storing instructions that, when executed by the at least one processor, cause the at least one processor to:
    determine if the at least one electronic device is registered with the managing device.

11. The system of claim 8 wherein the non-transitory computer-readable medium storing instructions that, when executed by the at least one processor, cause the at least one processor to:
    determine if the device manufacturer is registered with the managing device.

12. The system of claim 8, wherein the single viewer device dashboard is a user interface of a hardware device through which a user views and controls the at least one electronic device.

13. The system of claim 8, wherein the external manufacturer applications enable sending and receiving real-time events or notifications from the personal network to the at least one electronic device and vice versa.

14. The system of claim 8, wherein the non-transitory computer readable medium storing instructions that, when executed by the at least one processor, cause the at least one processor to
store and use information data; and
acquire and process data received from the at least one electronic device, capture real-time events and convert data into canonical format and store it in the real-time.

15. The system of claim 8, wherein the non-transitory computer-readable medium storing instructions that, when executed by the at least processor, cause the at least one processor to:
process the performance data history, wherein the performance data history comprises past performance, energy consumption, and past configurational settings, to analyze the insights of the at least one electronic device, and share with the device manufacturer if they opt for it by subscribing through their dashboard applications.

16. The system of claim 8, wherein the non-transitory computer-readable medium storing instructions that, when executed by the at least one processor, cause the at least one processor to:
aggregate the data from real-time view and batch view that will be subscribed by the device manufacturer for their analyses of all the performances data of the at least one electronic device and customize to receive data at regular intervals.

17. The system of claim 8, wherein the non-transitory computer-readable medium storing instructions that, when executed by the at least one processor, cause the at least one processor to:
send the recommendations data to a user device in real-time via the personal network.

18. The system of claim 8, wherein the non-transitory computer-readable medium storing instructions that, when executed by the at least one processor, cause the at least one processor to:
send the recommendations data to the device manufacturer in real-time.

19. A non-transitory computer readable medium including instructions stored thereon that when processed by a processor cause a first computing device to perform acts of:
identifying at least one electronic device through at least one personal network;
identifying a type and a device manufacturer associated with each of the at least one electronic device, through at least one commercial network;
determining one or more device parameters associated with the at least one electronic device;
generating performance data history of the at least one electronic device based on the one or more device parameters, wherein the performance data history is generated as real-time view of events and batch view in a canonical format, and the performance data history includes:
past performance data of the at least one electronic device,
energy consumption of the at least one electronic device, and
past configuration settings of the at least one electronic device;
analyzing the performance data history of the at least one electronic device;
generating one or more recommendations data based on the analysis of the performance data history;
determining that the device manufacturer associated with the at least one electronic device has subscribed to receive the generated performance data history of the at least one electronic device through an application programming interface; and
providing to the device manufacturer, when the device manufacturer has subscribed to receive the generated performance data history, the performance data history.

\* \* \* \* \*